US008606884B2

(12) United States Patent
Kim (10) Patent No.: US 8,606,884 B2
(45) Date of Patent: Dec. 10, 2013

(54) SYSTEM AND METHOD FOR WEB HOSTING BEHIND NATS (76) Inventor: Taesung Kim, Philadelphia, PA (US)

( * ) Notice: Subject to any disclaimer, the term of this patent is extended or adjusted under 35 U.S.C. 154(b) by 156 days.

(21) Appl. No.: 13/237,162

(22) Filed: Sep. 20, 2011

(65) Prior Publication Data

US 2012/0072548 A1    Mar. 22, 2012

Related U.S. Application Data (60) Provisional application No. 61/384,930, filed on Sep. 21, 2010.

(51) Int. Cl.
G06F 15/16 (2006.01)
(52) U.S. Cl.
USPC .......................................... 709/219; 709/223
(58) Field of Classification Search
USPC .................................. 709/219, 223
See application file for complete search history.

(56) References Cited

U.S. PATENT DOCUMENTS

| 2008/0126528 | A1* | 5/2008 | Takeda et al. | 709/223 |
|---|---|---|---|---|
| 2008/0288580 | A1* | 11/2008 | Wang et al. | 709/203 |
| 2010/0077087 | A1* | 3/2010 | Roy et al. | 709/228 |
| 2010/0094978 | A1* | 4/2010 | Runeson et al. | 709/221 |
| 2010/0167740 | A1* | 7/2010 | Vakil et al. | 455/436 |
| 2010/0198938 | A1* | 8/2010 | Molland et al. | 709/217 |
| 2011/0055392 | A1* | 3/2011 | Shen et al. | 709/225 |
| 2012/0011189 | A1* | 1/2012 | Werner et al. | 709/202 |
| 2012/0054348 | A1* | 3/2012 | Rollgen | 709/227 |

* cited by examiner

Primary Examiner — Waseem Ashraf
(74) Attorney, Agent, or Firm — The Webb Law Firm, P.C.

(57) ABSTRACT

A method for facilitating users to provide web content to the public from computers connected to a public network through a Network Address Translation (NAT) gateway. The system includes a rendezvous server to provide NAT traversal to enable direct connections between client computers and host computers behind a NAT gateway by receiving data relating to host computers; determining whether NAT gateways associated with host computers are traversable; receiving requests from client computers to access the host computers; determining open ports of the NAT gateways; and transmitting data to the client computers such that the client computers are able to initiate direct connections with the host computers. A computer program product for implementing the aforementioned method includes appropriately communicatively connected hardware components.

20 Claims, 8 Drawing Sheets

SYSTEM AND METHOD FOR WEB HOSTING BEHIND NATS

CROSS REFERENCE TO RELATED APPLICATIONS

This application claims the benefit of U.S. Provisional Patent Application No. 61/384,930, filed Sep. 21, 2010, titled "System and Method for Web Hosting Behind NATs".

BACKGROUND OF THE INVENTION

1. Field of the Invention

The present invention pertains to the fields of web hosting, particularly to computer implemented systems and methods for facilitating web hosting from computers behind a Network Address Translation (NAT) gateway.

2. Description of Related Art

Since the Internet has gained vast appeal, various forms of web pages have been produced. Although there are numerous websites, only a small portion are built by owners due to the time consuming nature and complexity of the tasks involved in setting one up. Most websites are built by web hosting companies, even though individual website owners already have the resources, such as computers and network connections, to build and host their own websites.

In order to begin web hosting, various demanding tasks are required, such as setting up an HTTP server, registering a URL (uniform/universal resource locator) and obtaining a static (public) IP address. Further, creating a web site using HTML and other script languages is a burdensome task for most people and small businesses in terms of time and money. For those who have built their own websites, it might still be a daunting task to introduce and advertise that website to the public.

For this reason, most individuals use services such as blogs or homepage builders provided by portal sites or social networking sites rather than creating their own personal websites and homepages. Small businesses usually create and maintain their websites through web hosting companies instead of doing it themselves.

However, the services of large internet companies and web hosting firms are not the best solutions for individuals and are not always beneficial for small companies. If someone has his or her private blog hosted on an internet company's servers, the sites will be inflexible because those services generally provide narrow choices and limited freedom for individuals to design their own style of website. Additionally, unnecessary add-ons provided by some service providers, such as advertisements placed on the website, are often unavoidable. Creating an account and storing personal information on a company's servers cannot be free from the risk of leaking personal information. Further, for small companies and local businesses, the indirect way to maintain their websites with a hosting company can make the website difficult to maintain. All updates and changes could take a long time and could be a burden in terms of cost if all changes have to go through a hosting company. Although DIY web page building sites provide ways for users to build homepages for small businesses, all contents (i.e., pictures, documents and other files) must still be stored on the web hosting companies' servers, which makes building web pages slow and increases the cost of building the website. Moreover, internet browsers are often the sole tool for users to communicate with the web hosting company or service.

NAT is the most universal technology developed for resolving the issues caused by the lack of IP (Internet Protocol) addresses. NAT allows stations behind a NAT gateway (also referred to as a NAT, a NAT translator, a NAT device or a NAT application) to share a public IP address with a specific port number which is used to distinguish the station from others.

Such a method, being used by a NAT, does not cause any problems when stations behind a NAT attempt to connect to hosts outside of the NAT. However, when hosts outside the NAT attempt to connect to stations behind that NAT, such a connection is impossible because the IP addresses used by the stations behind the NAT are only available within the private network of the NAT. In addition, any outside attempts to connect to a station behind a NAT with a private address may lead to a wrong or failed connection. Moreover, when stations outside of the private network attempt to communicate with the stations behind the NAT, they must pass through the NAT. However, as NAT only remembers specific port numbers and allocates relevant packets for those ports to the stations behind the NAT upon their connection attempt, it does not allow the packets which originated from the connection attempt from outside the private network without the request of the stations within the private network (behind the NAT).

NAT technology allows stations to reliably share IP addresses and to block unnecessary connection trials from the outside, having the advantage of preventing extraneous intrusion. However, if both stations are behind their own NAT, neither station will be able to connect to each other, resulting in serious problems for games and VoIP programs where peer-to-peer connections are required.

For such reasons, several NAT traversal techniques have been introduced and, among them, the most commonly used method is STUN (Simple Traversal of UDP Through Network Address Translation Devices). Also called Hole Punching, this technology takes advantage of a principle which allows packets to pass through a NAT upon the connection attempt of the other station by sending additional packets.

In applications using UDP, Hole Punching technology is relied upon for business applications, owing to its extremely high success rate. However, such a method is not readily applicable to programs using TCP (transmission control protocol).

For instance, assuming that user A is behind NAT A and user B is behind NAT B, in the case that UDP is used, if user A sends a packet to user B in advance, NAT B will not allow user A's packet to pass and it will be discarded. If the packet is sent directly from user B to user A, NAT A, since it remembers the packet sent by user A, will allow user B's packet to pass and user A will be able to receive user B's packet, and such a packet exchange will be continued. However, in the case that TCP is used, when user A sends a packet, a SYN number is also sent, randomly allocated by the operating system, and user B must send a value to which 1 is added. But, because NAT B drops the first-sent packet, user B will be unable to identify a correct SYN number, resulting in difficulty establishing a connection.

Owing to such difficulties, the case of TCP is more complicated that that of UDP NAT traversal. There are four well known representative methods of TCP NAT traversal.

1. Simple Traversal of UDP Through NATs and TCP Too (STUNT #1)

Using a Low TTL (Time To Live) technique, which involves making a packet bypass its own NAT and expire before reaching its destination by setting a low TTL value, user A sends SYN to user B. Because this SYN has a TTL value just high enough to pass through NAT A, it will be returned with an ICMP (Internet Control Message Protocol) message before it reaches NAT B. At this time, if user A sends the SYN value to the server, which has a public address, referring to the returned ICMP, the server will send user A a correct SYN value along with SYNACK after changing it to user B's address. At the same time, user B also sends SYN to user A and carries on communication after establishing a connection by extracting a SYN value from the ICMP in the same way.

2. Simple Traversal of UDP Through NATs and TCP Too (STUNT #2)

Like STUNT #1, user A sends SYN using a Low TTL technique. This SYN opens a specific port while it is passing through NAT A. After it passes through NAT A, it will be returned again, generating an ICMP message before reaching NAT B. Then, user B sends a new SYN and NAT A, even though it expects SYNACK because SYN has gone to user B, allows SYN in consideration of simultaneously opening TCP, which is designed to allow them to establish the connection when user A and user B send SYN at the same time, and the connection will be reestablished by the SYNACK (the reply of SYN) sent by user A.

3. NAT Blaster

As is the case with the above STUNT #1 method, users A and B send SYN to each other using a Low TTL technique. If the SYNs sent by the users are returned, the necessary value will be extracted from the SYNs and the value will be sent through an auxiliary communication channel using a medium such as an intermediary server. User A and user B send each other SYNACK, referring to SYN and SEQ, and they establish a connection while sending ACK.

4. Peer to Peer NAT

Peer to Peer NAT is a way of establishing a connection, dependent upon the simultaneous opening of TCP without using Low TTL and, in this case, user A and user B simultaneously send SYN to each other. At this moment, as both NATs have already sent an outbound SYN, they will be able to accept an inbound SYN. As a result, each user can establish connections while continuing SYNACK.

According to the Characterization and Measurement of TCP Traversal through NATs and firewalls, the success rate of each case is as follows: STUNT #1 (75~87%), STUNT #2 (68~86%), NAT Blaster (70~83%) and Peer to Peer (NAT 45~85%). Although these methods may seem to show a high success rate, a failure rate higher than 10% is unacceptable for business purposes. Further, in many cases, reading a SYN value upon receiving an ICMP message (as used for NAT Blaster) is impossible depending on the operating system of the relevant user. Therefore, it is inapplicable and the Low TTL technique, used for STUNT #1, STUNT #2, and NAT Blaster, is also not free from the probability of failure because the response of NAT to ICMP error message can be varied. In addition, now that the acceptable range of Raw Socket Programming may vary according to operating system, its application may be subordinate to the type of operating system.

SUMMARY OF THE INVENTION

It is the object of the present invention to provide a system and method for facilitating host computers behind a NAT gateway to perform as a web server, allowing individuals, organizations and businesses to host web sites using their own PCs and other computing systems without having to purchase additional devices or to undergo the process of service registration. It is the further object of this invention to facilitate the establishment of direct connections, traversing at least one NAT gateway, between at least one client computer and at least one host computer.

According to one aspect of the present invention, there is provided a system for facilitating a direct connection between at least one host and at least one client computer, wherein the at least one host is connected to a public network through at least one Network Address Translation (NAT) gateway, the system comprising: a rendezvous server computer having a public Internet Protocol (IP) address, wherein the rendezvous server computer is configured to: determine if the at least one NAT gateway is traversable; receive at least one request from the at least one client computer to retrieve data from the at least one host; determine at least one port number, wherein the at least one port number relates to at least one port of the NAT gateway; transmit the at least one port number to the at least one client computer; and transmit data to the at least one client computer, such that the at least one client computer is able initiate at least one direct connection with the at least one host.

According to another aspect of the present invention, there is provided a computer-implemented method for establishing a direct connection between at least one host computer and at least one client computer, wherein the at least one host computer is connected to a network through at least one Network Address Translation (NAT) gateway, the method comprising: receiving data relating to the at least one host computer; determining whether the at least one NAT gateway is traversable; receiving a request from at least one client computer to access the at least one host computer; determining at least one port number, wherein the at least one port number corresponds to at least one port of the at least one NAT gateway; and transmitting data relating to the at least one host computer to the at least one client computer, wherein the data relating to the at least one host computer includes the at least one port number, such that the at least one client computer is able to initiate at least one direct connection with the at least one host computer.

According to another aspect of the present invention, there is provided a computer program product comprising a computer readable medium having control logic stored therein for causing a host computer to provide web content to at least one client computer, wherein the host computer is connected to a public network through at least one Network Address Translation (NAT) gateway, the control logic comprising: first computer readable program code means for causing the host computer to transmit data relating to the host computer to a rendezvous server; second computer readable program code means for causing the host computer to receive a connection request from the rendezvous server; third computer readable program code means for causing the host computer to receive, from the rendezvous server, data configured to determine whether the at least one NAT gateway is traversable; fourth computer readable program code means for causing the host computer to receive at least one HTTP request directly from the at least one client computer, wherein the at least one HTTP request traverses the at least one NAT gateway; and fifth computer readable program code means for causing the host computer to transmit at least one HTTP response directly to the at least one client computer.

BRIEF DESCRIPTION OF THE DRAWINGS

The following description of the example embodiment(s) is merely exemplary in nature and is in no way intended to limit the invention, its application, or uses.

DESCRIPTION OF THE PREFERRED EMBODIMENT(S)

The following description of the example embodiment is merely exemplary in nature and is in no way intended to limit the invention, its application, or uses.

Figure 1:
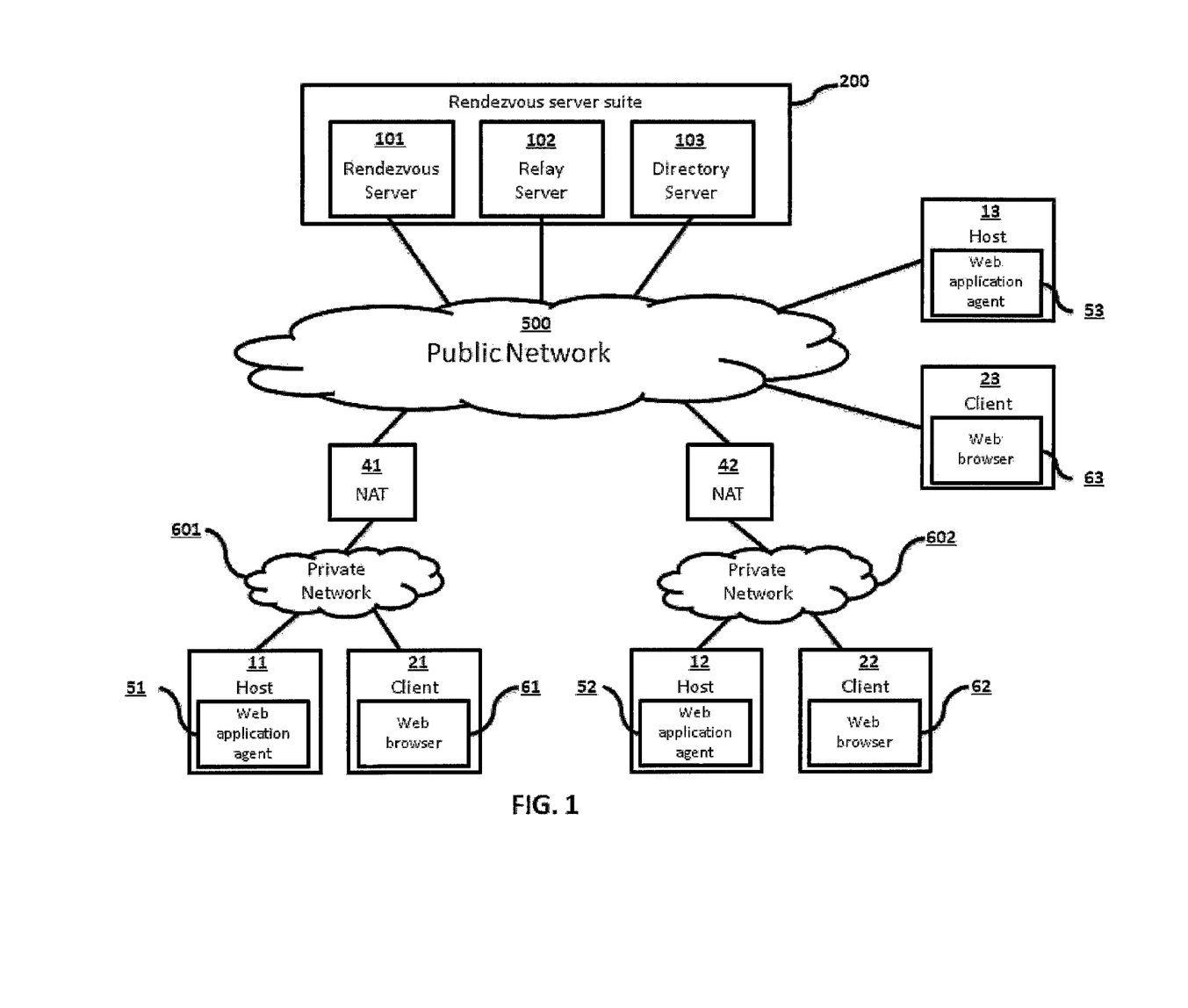
FIG. 1 is a network configuration diagram according to an embodiment of the present invention.

With reference to FIG. 1, the rendezvous server suite 200 is a set of servers which can include rendezvous server 101, relay server 102, and directory server 103. The servers 101, 102, and 103 are components of the system. Although the servers 101, 102, and 103 are depicted as a separate servers, the servers can have different physical and logical implementations as known to one having skill in the art. For example, in one possible and non-limiting embodiment, the servers can be together physically (i.e., operated on the same hardware) and can be implemented through an application or other software. Additionally, the servers can be physically and/or logically separate from each other. In a preferred but non-limiting embodiment, the servers can exchange messages and data.

In a preferred but non-limiting embodiment, the rendezvous server 101 may have two or more public IP addresses and use RAW socket programming to properly examine the characteristics of the NATs. The relay server 102 and directory server 103 are also provided with at least one public IP address so that the hosts and clients are able to establish a connection with the servers. Additionally, the directory server 103 may be provided with one or more domain names for users' convenience and additional functions.

Host 11, 12, and 13 are stations (i.e., computers) which have a web application agent 51, 52, and 53 capable of serving web content. Client 61, 62, and 63 are stations which will visit the websites of the hosts using web browsers such as, but not limited to, Internet Explorer, Firefox, or Chrome. NATs 41 and 42 connect to public network 500, providing a Network Address Translation to enable hosts or clients to share a public IP address. A NAT may constitute hardware or software which filters inbound unauthenticated packets from outside connections. In a preferred but non-limiting embodiment, a hardware router or a software-implemented firewall may be used. In the embodiment depicted in FIG. 1, host 11, 12 and client 21, 22 are connected to their respective private networks 601, 602, but host 13 and client 23 are connected to the public network 500. Here, it is assumed that the operating systems of hosts and clients do not allow the use of raw socket programming, which might provide the freedom to create packets, because many operating systems do not support raw socket programming for security reasons.

Web application agent 51, 52, and 53 are web server programs installed on the host 11, 12, and 13. In a preferred but non-limiting embodiment, these programs may provide a Do-It-Yourself (DIY) style HTML builder, HTML editor, tools to create and generate web content, and web templates so that users are enabled to easily build or generate a website. Although the basic purpose of the web application agent is to publish web pages as an HTTP server, further embodiments may include extended services for video broadcasting, music streaming, on-line payment and other different application types known to those skilled in the art. When the client uses RIA (Rich Internet Application), the web application agent might not need to send data in the form of HTTP and may instead use the RIA's own protocol for efficient data transfer.

Two types of networks are depicted in FIG. 1. The public network 500 is the main network. In a preferred but non-limiting embodiment of the invention, the public network may be the Internet, generally, or a network that is able to be reached from the Internet. All stations in the private network 601, 602 use local addresses. A local address is only unique, and therefore only capable of proper use, among the stations in the same private network. For example, the host 11 and client 12 can connect to each other with their own private IP addresses, but client 21 and host 12 cannot reach each other with their local IP addresses because those local IP addresses are not universal as are public IP addresses.

In modern computing practice, many computers are connected on a private network with a NAT and most of the NATs do not allow connection attempts from computers outside of the private network to stations inside of the network. As previously mentioned, NAT is a popular solution for sharing a single IP address for multiple stations. The main mechanism involves mapping private IP addresses to public IP addresses with a certain port number. Referring now to FIG. 1, when the client 21 wants to establish a connection with a station that is directly connected to the public network 500, it will first send a TCP packet to NAT 41 because that NAT serves as a gateway to the private network 601. Once NAT 41 receives the packet from the client 21, it changes the source IP address and port of the packet and forwards it to the station in the public network. When receiving a packet in response to the packet previously sent by the client 21, the NAT 41 checks the port address of the packet. If the NAT finds the matched destination port number of the packet in its mapping table, it forwards the packet to the station inside. However, the NAT discards the packet if it does not find any matches in the table.

Therefore, stations behind a NAT can establish a connection when the stations first try to connect to other stations (i.e., computers) connected to the public network. However, any attempts to connect to stations behind a NAT (i.e., inside stations) from outside of the NAT will not be successful if the stations outside of the NAT first send a packet to the stations inside the NAT. Therefore, the web servers should be connected to the public network with a static IP address in order to properly serve clients connected on either a public or private network.

Embodiments of this invention are designed to assist the service of stations, including hosts and clients, behind a NAT. The host 11 provides HTTP content using a web application agent 51. When the host 11 starts the web application agent 51, the application connects to the rendezvous server 101. After the connection is established, the web application agent 51 sends a message which may include attributes and information such as, but not limited to, a local IP address, owner name, purpose of the website and contact information. The information can be used as key words to facilitate searches performed by public clients.

After receiving the information, the rendezvous server 101 is able to determine the existence of the NAT 41 by comparing the local IP address conveyed by the message with the external IP address from the message. After storing information from the message, the rendezvous server 101 might perform four types of tests to determine the characteristics of the host 11 for the NAT traversal.

Figure 2:
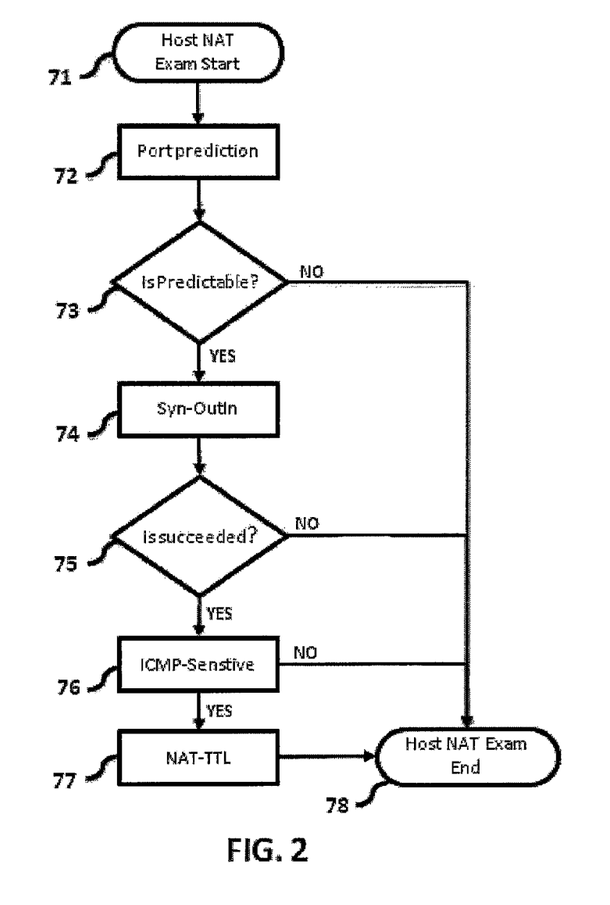
FIG. 2 is a flowchart of steps to determine capability for the NAT traversal.

FIG. 2 shows steps for one possible characteristic test of the host side's NAT. Since there are many kinds of NATs and each NAT may have different ways to assign port numbers, a port prediction test 72 is necessary for achieving the hole punched connection. Although patterns used by NATs for assigning a port have been typically divided into four categories (full cone, restricted cone, port restricted cone, and symmetric cone), the methods may also be categorized as being either predictable or non-predictable. If the methods of assigning a port are predictable, the rendezvous server is able to anticipate which port number the NAT is going to open next. However, some NATs assign port numbers which cannot be predicted. To know whether the next port number is predictable or not, the rendezvous server performs a port prediction test 72 using the different IP addresses.

A port prediction exam 72 can be performed by creating new connections and checking the port numbers of those connections. For example, if the rendezvous server 101 creates N number of listening ports and web application agent 51 makes connections to all N ports, N connections will be established between the server and host. With N port numbers, the server can find N−1 gap values. For example, if the port numbers of the connections are 30011 and 30012, the next port can be 30013, assuming the new port number is the previous port number +1. Therefore, N should be greater than two in order to get one or more gap values. When the server performs the exam with two port numbers and the two port numbers are 30011 and 30013, the gap value is likely equal to 2. It may be necessary for the test to be performed quickly because other applications of the same station or other stations in the same NAT can also cause the NAT to open the new port. If another application opens the new port of the NAT, the gap value might be calculated incorrectly which will lead to failure of the hole punching traversal technique. In addition, the port prediction exam needs to be performed both using the same IP address and different IP addresses because NAT can use different port number assigning patterns or different starting port numbers depending on the destination IP address.

At step 73 in FIG. 2, if the server 101 fails to achieve a steady gap value from the test or if it is not able to predict the new port number, the host-side NAT characteristic test does not need to perform further tests because the NAT traversal cannot be established without the capacity to predict a new port number. If this test fails, the server may support packet relaying as an alternative solution. Otherwise, the server performs SYN-OutIn, the next exam, if the new port number is predictable.

A SYN-OutIn exam 74 determines whether the NAT can allow an incoming SYN packet through the same port on which a previous outgoing SYN packet was sent. In a preferred but non-limiting embodiment, the SYN-OutIn exam 74 is required for the NAT traversal. If the exam is not successful, further tests do not need to be performed. This SYN-OutIn test can be performed by the following method: the rendezvous server 101 requests a SYN packet from web application agent 51 after opening one listening port. After receiving a SYN packet from the agent 51, the server sends a new SYN packet back to the agent 51. If the server 101 receives the SYNACK packet back from the agent 51, the exam is successful. If the server does not receive a SYNACK packet back, the test result might be negative and further tests do not need to be performed, although the server will then perform packet relaying as one of the other possible solutions for the client.

In a preferred but non-limiting embodiment, if the SYN-OutIn exam was successful at step 75, an ICMP-sensitive exam is performed. Some types of NATs close the port when receiving a Time Exceeded ICMP message. Since the web application agent can generate ICMP using a Low TTL technique, the ICMP-sensitive test might need to be performed.

At step 76, the rendezvous server 101 requests a SYN packet from the web application agent 51 after opening one listening port, as in the previous test 74. The server sends a Time Exceeded ICMP message after receiving a SYN packet. The server then sends a new SYN packet. If the server 101 cannot receive the SYNACK, it may be assumed that the NAT closed the port because of the Time Exceeded ICMP message. If the NAT closed the port after receiving the ICMP message, the NAT traversal may still be possible depending on the behavior of the NAT on the other side or the type of client. However, if the NAT does close the port after receiving the ICMP message, the next test, NAT-TTL 77, does not need to be performed.

With continuing reference to FIG. 2, a final test on the host side that may be performed in a preferred but non-limiting embodiment is NAT-TTL 77. The purpose of the NAT-TTL test is to determine the number of hops between the host NAT and the client NAT based on the principle that the first packet needs to be expired before arriving at the opposite NAT. A hop represents a portion of the path between the client (or client NAT) and the host NAT. Generally, the number of hops in a path represents the number of devices through which a data packet passes before reaching its destination. Therefore, the web application agent 51 might want to know the distance (hops) between the host and the NAT. Once the web application agent 51 knows the distance to its NAT, the TTL value might be x+1 or x+n, where x is the number of hops (distance) to the NAT. Since an ICMP Time Exceeded message should occur between two NATs, some might want to know the distance from the host to the host's NAT as well as the distance from the host to the client's NAT for an accurate measurement of the number of hops. However, it may be okay to use the number from the host to the host's NAT plus 1 or plus a proper small number. In theory, any number between the NATs may be chosen.

A preferred but non-limiting method for the NAT-TTL test 77 involves using the ICMP Ping message. Once the host's NAT IP addresses are known, the agent application continuously sends a ping with increasing TTL values starting from 1. When the ping is successfully complete, the final TTL value is the distance between the host and its NAT. Although this method cannot work properly if the NAT does not turn on a ping server, there are further methods of calculating the distance which are known by those having ordinary skill in the art.

After the NAT-TTL test 77, the rendezvous server 101 might store the test results and information of the host in order to find the best solution for the client and host.

The main purpose of the directory server 103 is to maintain the list of the available hosts and to show their information to the clients. Additionally, a list of unavailable hosts may be stored for further usage. Since the directory server may be configured to show the list of hosts via a portal site, clients may need to connect first to the directory server 103 to get the hosts' information before connecting to the hosts. However, the client may be capable of connecting to the host directly if the client knows the host's unique URL and unique user domain name which the user requested, described in further detail below.

The host 11 will be shown at the page of the portal site as a link when the host 11 has finished the initialization, including the characteristic tests. Additionally, the client 22 can view the basic information of the host 11 and the link through its web browser when visiting the portal site. The link of the host 11 might reveal the rendezvous server's IP address or URL with the host's unique ID in the HTTP GET parameter (e.g., www.rendezvousurl.com?hostid=1011) so that the rendezvous server can operate as a intermediate server to support the connection between the host and client.

Because the preferred embodiments of the invention are designed to use standard browsers as the client program, the system generally only uses the TCP socket connection used by all types of browsers, even when creating a hole punched connection. Therefore, the users do not need to download any programs or plug-in programs for the NAT traversal or packet relaying service. Since cross domain issues may be a major problem for the browser of the client, HTML IFrame tags and AJAX can be used as key components to test the characteristics of the client side NAT and to make a direct connection between the host and client. Additionally, HTTP version 1.1 allows one to continuously use a connection if the connection type is set to "keep-alive." If the browser supports HTML 5, WebSocket technology can be of great assistance instead of IFrame and AJAX. However, depending on the client browser or users' preferences, the traversal or packet relaying can be performed via RIA (Rich Internet Applications) such as Adobe Flash and Microsoft Silverlight. Even though RIA needs to be downloaded as an application or plug-in, the use of such technology may be able to provide a richer and steadier solution than provided by the pure browser.

In a preferred but non-limiting embodiment, when a client connects to the directory server with its browser, the client is able to view the list of available hosts. When the user of the client selects one of the hosts, the directory server redirects the client to the rendezvous server 101 with the unique host ID that the user selected on the host list. It may also be possible for the user to input the unique domain string in the URL instead of clicking the item on the host list of the directory server (i.e., http://directory_servoer.com/unique_string_ID). When the connection between the rendezvous server 101 and the client 22 is established, the rendezvous server 101 retrieves the information relating to the host side's NAT chosen by the client. Then, the rendezvous server 101 sends an HTML page which is used for getting the basic information of the NAT 42 and client 22 in order to determine which solution is best for the connection between the host and client.

Figure 3:
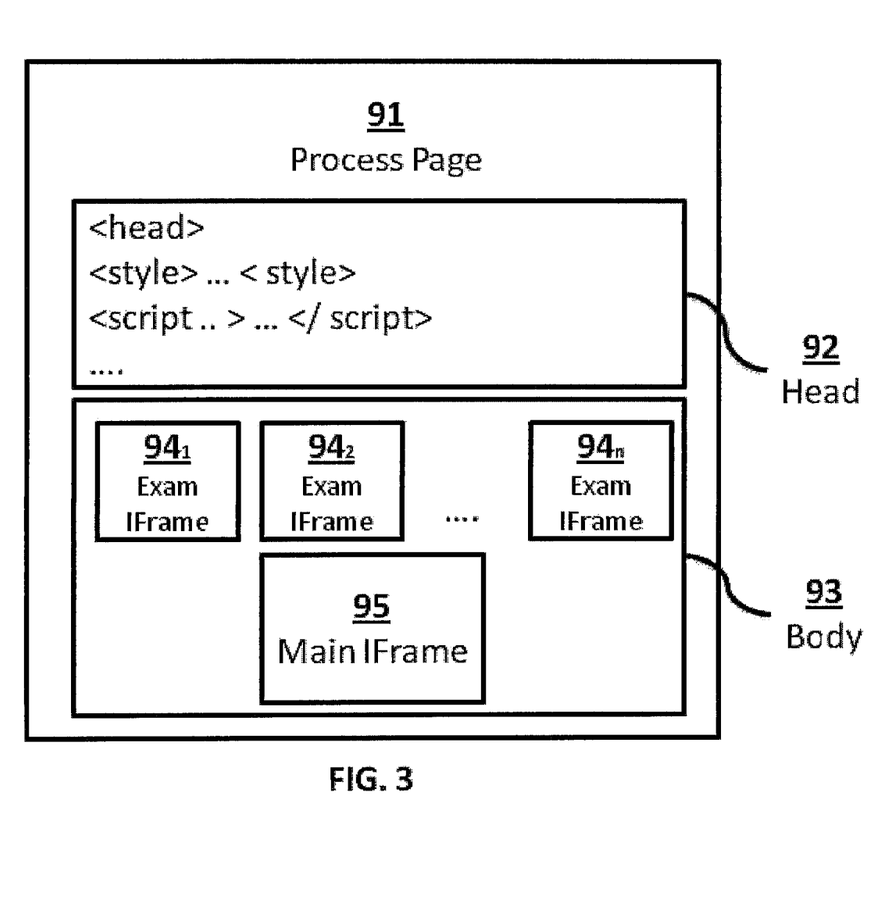
FIG. 3 is a block diagram of a Process Page which operates to perform a NAT traversal using script code and IFrames.

When a client uses an HTML browser without RIA or HTML 5 supports, IFrame and AJAX might be relied upon to test the characteristics of the client side NAT. With reference to FIG. 3, an HTML page 91 includes a number of IFrame tags 94. In a preferred but non-limiting embodiment, three IFrame tags are used.

The process page 91, which the client receives from the rendezvous server 101, may include the script functions to control the IFrames and AJAX functions in the HEAD tag 92 of the HTML code. The script code can be located on the host side and can also be remotely located on the other server. When the HTML document loading is completed, the rendezvous server 101, web application agent 51, and the browser of client 62 start communicating to find the appropriate method for the client and the host.

Because general HTTP servers send a response message after a client sends an HTTP request, the servers cannot send any message without a request from a client (e.g., by sending request messages). In order to enable the server to send a command to the browser whenever it needs to, the server may need to add the AJAX function call at the end of every script code so that the server can receive an HTTP request message and send back a response message when it needs to send a command.

Figure 4:
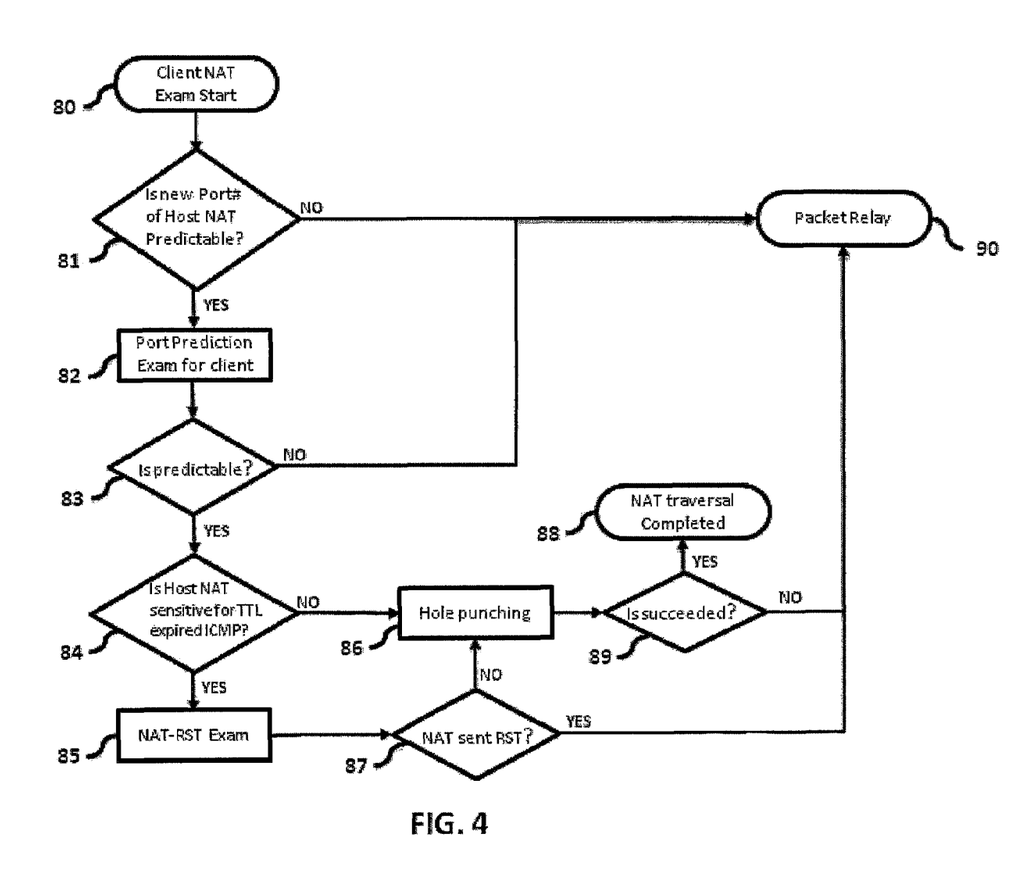
FIG. 4 is a flowchart of steps to connect a client with a host using the retrieved information of the host.

With reference to FIG. 4, the server starts the test at step 80. Since the new port numbers of both NATs (i.e., the host NAT and the client NAT) must be predictable for the NAT traversal, both port prediction tests 81, 83 might be performed first in order to reduce unnecessary delay resulting from the other tests. Port prediction of the host NAT 81 is already tested when the host is connected with the rendezvous server 101. If the new port number of the host side NAT was previously found to be predictable, the rendezvous server 101 and client 22 start testing the client side NAT port prediction 82.

In a preferred and non-limiting embodiment, the port prediction test for the client 82 is performed using three IFrames and the AJAX calls to control the browser. First, the rendezvous server 101 opens three listening ports and sends a message which includes the port numbers of the listening sockets associated with the browser 62 of the client 22. The script included in the message from the server causes each IFrame to connect to each listening port. When the connections are established, the rendezvous server 101 retrieves the port numbers from the connections. After analyzing the numbers to determine what kind of pattern the NAT has for the new port, the rendezvous server determines whether or not the new port of the NAT is predictable. For example, the gap value is plus 1 if the port numbers are 10051, 10052, and 10053. Therefore, the server can determine that the NAT uses a predictable pattern for its new port number. If the port numbers are 10051, 10053, and 10054, the server will be unable to find a pattern because the gap values would be 2 and 1, which are uneven. In such a case, the server may examine the port numbers one more time because another factor might affect the result, such as whether the other connection has been tried from the other station. However, when the numbers obviously do not have a pattern, e.g., 10430, 51423, and 41923, the server may not need to test again.

A port prediction test 82 may be performed with both different IP addresses and the same IP addresses because some NATs use different patterns depending on the IP address. For example, it is possible that a certain NAT application has predictable open port behavior when the rendezvous server opens the listening sockets on IP 200.1.1.10, Port 51200 and IP 200.1.1.10, Port 51201. However, the NAT application might have an unpredictable new port number when the rendezvous server opens the listening sockets on IP 200.1.1.10 Port 51200 and IP 200.1.1.11 Port 51201. For similar reasons, different ports and the same ports can both be checked for information.

If a port is unable to be predicted, the packet relay service 90 might be started as an alternative method of NAT traversal. If the NATs of both sides use predictable new port patterns, the next check point is whether or not the host side NAT is sensitive for the TTL expired ICMP, an attribute which is already checked when the host connects to the rendezvous server. ICMP Sensitive refers to whether the NAT closes the port when it receives the Time Exceeded ICMP message. If the NAT is sensitive for the ICMP, there may still be an alternative method to perform the NAT traversal. Basically, the low TTL technique involves making the packet stop at some point before the packet reaches the opposite side NAT. Stopping the packet before it reaches the opposite side NAT is done to prevent the NAT from receiving the RST packet because the NAT, as well as the operating system of the host or client, closes the TCP connection once it receives the RST packet. However, the opposite NAT will not send any RST packets via TCP if the packet is stopped before it reaches the NAT. For this reason, a low TTL technique is used for hole punching TCP. Even if the low TTL technique cannot be used due to the sensitive NAT, some NATs ignore the packet sent to the unopened port and do not send a RST packet back. Therefore, the rendezvous server 101 may want to check whether or not the client side NAT 42 sends back a RST packet when it receives a packet directed to the unopened port.

In one embodiment of the presented invention, NAT-RST Exam 85 is performed between the rendezvous server 101 and the web browser of the client 62. The rendezvous server 101 requests a connection to the web browser. After getting the port number from the connection, the server sends a SYN packet to the port number which is expected to be open. Then, the server needs to monitor the traffic for a few seconds to check for the incoming RST packet from the client 22. If the rendezvous server 101 does not receive the RST, it may indicate that the NAT traversal can be performed even if the host side NAT is sensitive for Time Exceeded MCP messages.

Once the requirements for the NAT traversal are satisfied, the rendezvous server 101 tries to perform a hole punching for the direct connection between the web application agent 51 and the web browser of the client 62.

Figure 5:
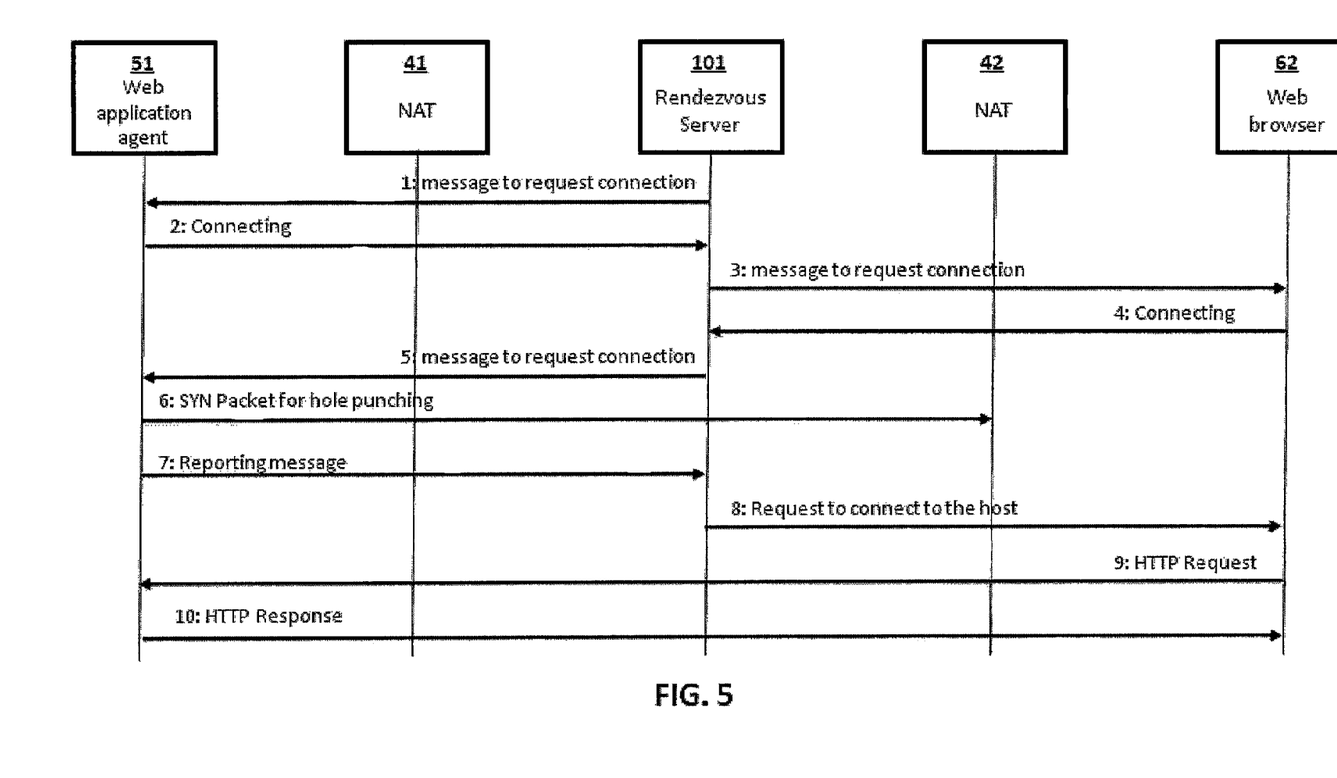
FIG. 5 is a sequence diagram of messages between the web application agent and the web browser for the NAT traversal.

FIG. 5 depicts a message passing embodiment of the hole punching process. It is assumed that the host and client are connected in different private networks 601, 602 which are behind NATs 41 and 42. The NATs can be other equipment or network management software such as a firewall or proxy server. It is additionally assumed that connections between the web application agent 51 and the rendezvous server 101, and between the web browser of the client 62 and the rendezvous server 101, are already made.

Referring now to FIG. 5, several steps are shown which depict the various communications made between the components of the system. In the first communication, the rendezvous server 101 opens a listening port and sends the port number to the web application agent 51 in a message to request connection 1. When a connection 2 from the web application agent 51 is established, the rendezvous server retrieves the port number. Since port prediction was successful, the rendezvous server is able to determine the next port of NAT 42 expected to be open. Then, the rendezvous server 101 opens another listening port and sends the port number to the web browser 62 in a message 3. After receiving the port number, the browser will create a connection using an IFrame because of the cross domain issue in the browser. When the requested connection 4 from the IFrame is established, the rendezvous server 101 stores the newly-generated port number of the client 22. Then, the rendezvous server 101 sends a request to the web application agent 51 with the expected new port number of the client 22 in a message 5. The web application agent 51 sends a SYN packet 6 for hole punching to the expected port number which will be opened by the web browser 62. The SYN packet may use the low TTL technique if the NAT 42 sends the RST packet upon the arrival of the SYN packet at the NAT's unopened port. After sending the SYN packet, the web application agent 51 cancels the connection and opens a listening port with the same port number which it used to send the SYN packet. After opening the port, the web application agent 51 sends a reporting message 7 to let the server know that the SYN packet has been sent and that the agent just opened a listening port number. Then, the rendezvous server 101 sends a request message 8 to the web browser 62. The message may include the next expected open port of the web application agent 51 which may actually be created by the NAT 41. Additionally, the message makes the main IFrame 95, depicted in FIG. 4, connect to the web application agent 51 via the NAT's 41 IP address and newly-opened port. Once a connection is established between the web application agent 51 and the web browser 62, the main IFrame 95 of the web browser 62 communicates with the web application agent 51 via HTTP, meaning that the NAT traversal has been made successfully.

Although hole punching may be successfully completed and the connection between the host and client established, there may be further considerations. Although each browser refers to the HTTP and HTML rules, the HTTP and HTML specifications do not cover all of the browsers' functions. Each type of browser may have its own strategy to improve speed and reduce the delay. For example, browsers usually create one or two connections before downloading HTML code. However, if the page includes more than ten images or other content to be downloaded independently, browsers will open additional connections after downloading the HTML code. Since there is no standardized rule for opening a connection in the HTTP specification, different types of browsers may have their own rules and considerations, such as the number of connections made by the browser and what connections are closed or kept open by the browser. The number of connections is not the only consideration. There are further behavioral differences which may affect the hole punched connection. For instance, browser-A may send an HTTP request for the favicon.ico file right after the connection is established, but browser-B may send the request after the HTML loading is complete. Additionally, most browsers open another connection if the HTTP response for the previous request is not received and the connection may be disconnected when the browser determines that the HTTP request is not properly responded to with a correct HTTP response from the web application server. A programmer may be able to resolve the issues after analyzing the behavior of each browser. For example, the script function can be made to download one image at a time, controlling the SRC attribute of the IMG HTML tag, so that the browser downloads all images in the page via a single connection. Additionally, more connections may be made by the AJAX function and script code when the browser needs to achieve a better performance. For instance, the web browser may request more hole punched connections by sending an HTTP request through the AJAX function to the rendezvous server 101. Then, the rendezvous server 101, web application agent 51, and web browser 62 will follow the same series of communications depicted in FIG. 5. When a hole punched TCP connection has been made, represented by the HTTP request communication 9, the web browser can send image data or other content instead of the HTTP Request 9 in FIG. 5. Further, uploading and downloading a large file can be performed in a similar fashion. In a preferred but non-limiting embodiment, a script library is built or provided to control and facilitate more connections.

As explained above, the rendezvous server needs to consider each browser's connection management for stable service. However, RIA (Rich Internet Application) may support the client for a more reliable connection between the host and client because the socket connection can be managed. Adobe Flash and Silverlight are typical examples of an RIA, although other RIAs may be used. Since typical RIAs support the TCP socket connection handling, such technology may provide a method that is stable and reliable rather than relying on an arbitrary connection created by the browsers.

Even if the client does use RIA, the hole punching process would be similar to the steps provided in FIG. 5. However, additional steps would be needed because of the cross domain policy associated with RIA. For security reasons, the RIA, functioning within a browser, will send a checking message to the domain with which it will communicate. For example, when RIA needs to open a socket to IP address 220.1.1.10, the RIA automatically sends a message to 220.1.1.10 with the relevant port number (e.g., port number 843 for Adobe Flash) in order to check the policy file. However, a specific port number may be indicated and the request for the policy file sent before the RIA automatically sends the message. If a hole punched direct connection with RIA is desired, the cross domain restriction of RIA must be satisfied. Although there are few alternative methods, a preferred but non-limiting embodiment of a method to satisfy the cross domain restriction involves receiving the policy file from the domain in order to avoid changing local files. Additionally, the client may be provided with an installer to make changes in the computer. However, the issue can be resolved by causing the hosts to send the policy file to the RIA in the browser of the client.

For using RIA, the steps numbered 1 through 8 from FIG. 5 can be followed, using a Socket connection of the RIA. However, instead of the web browser 62 sending an HTTP request 9 to the web application agent 51, the RIA in the web browser 62 may be forced to send the request of the policy file to the web application agent. For example, in Adobe Flash, the Security.loadPolicyFile( ) function opens a new socket and sends the request of the policy file to the IP and port provided in the parameter of the function call. Then, when the web application agent 51 responds 10 to the web browser, the agent must send the strings contained in the policy file. After this process is successfully completed, the RIA client can connect to the host via TCP socket and then the steps depicted in FIG. 5 may be repeatedly performed as many times as desired to get a hole punched connection. When clients are supported by RIA, the communication between the host and client does not need to follow standard HTTP and HTML requirements. Instead, the customized protocol and interface of the RIA may be used for support. If the RIA supports a way to achieve a peer to peer solution, it can be another option to establish a direct connection before using a packet relaying solution. For example, Adobe Flash Player 10.1 supports P2P solutions with Real-Time Media Flow Protocol (RTMFP).

Even though the rendezvous server 101 checks the conditions of the host, NATs and client, it is still possible for the NAT traversal to fail. If the NAT traversal fails during the process, the web application agent 51 is able recognize the failure when it times out and communicate that failure to the server 101. When informed of the failure, the server 101 may try to make a hole punched connection one more time, which may require users of the client to wait longer. Otherwise, it may try an alternative method such as packet relaying.

Figure 6:
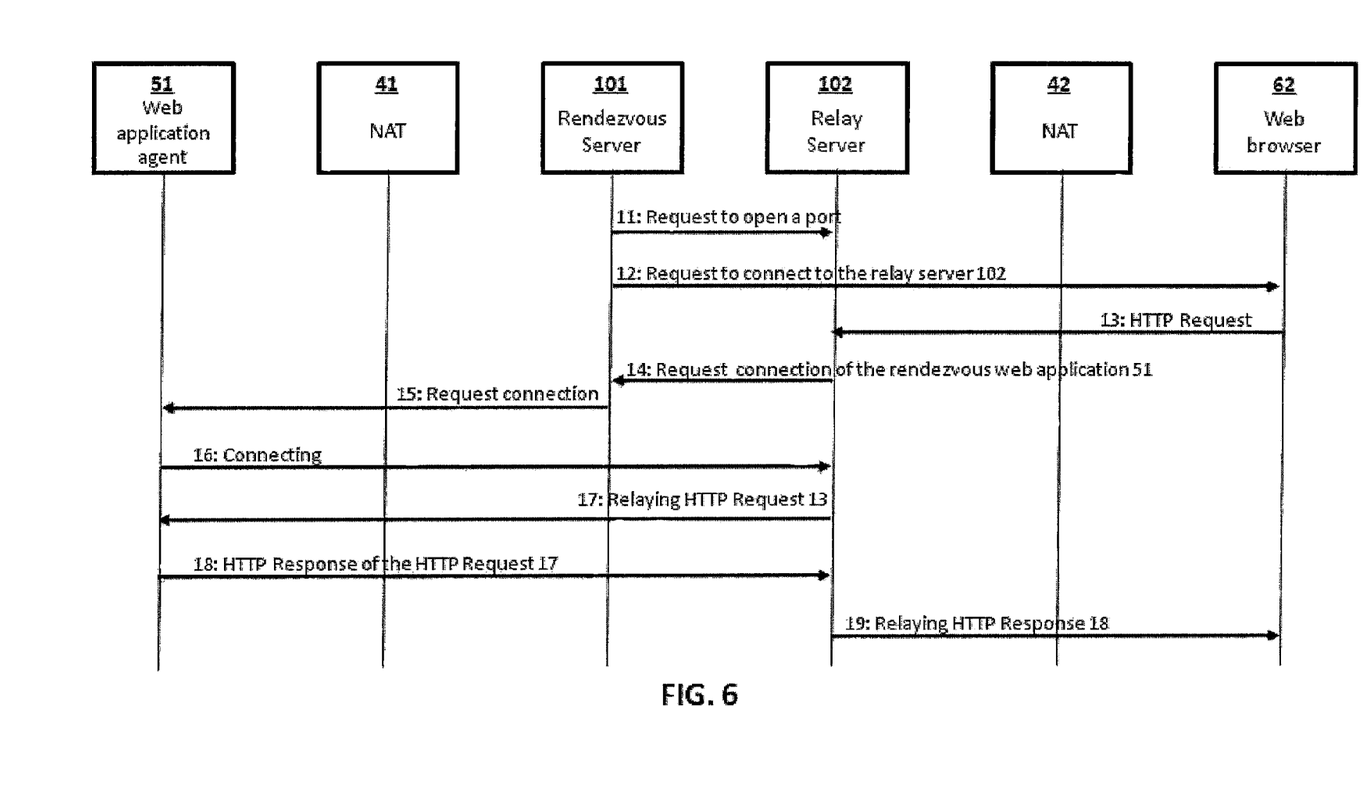
FIG. 6 is a sequence diagram of messages between the web application agent and the web browser for the packet relay when the NAT traversal is not available.

With reference to FIG. 6, a sequence diagram for the packet relay method is shown as an example of a possible embodiment. Although packet relaying is a simple and stable method, it consumes server-side resources as opposed to the direct connection method which uses almost no resources on the server-side once the connection is established. Therefore, the packet relay method may be used as a backup method for the direct connection when the NAT traversal is not successful. It is generally assumed that the rendezvous server has a connection with the web browser 62 and web application agent 52. To utilize existing connections, the relay server 102 sends a message when it needs to control the web browser and web application agent, which is in no way intended to limit the methods of communication.

When the rendezvous server 101 decides to start the packet relay process, instead of NAT traversal, it sends the relay server 102 a request message to make the relay server open a new port. From the point of view of the web browser 62, the relay server IP (or URL) and the new port will become the web service point which generates the web content. After sending a request to open a port, the rendezvous server 101 sends a request to connect message to the web browser 62. The purpose of the request to connect message is to make the main IFrame 95 in the browser send an HTTP request to the relay server 102. The message can be an HTTP redirect message or a script language command. Whenever one connection is established for an HTTP request 13, the relay server 102 sends a request connection message. Then, the rendezvous server sends a request connection message to the web application agent 51. After receiving the request from the rendezvous server 101, the web application agent 51 connects to the relay server 102. Then, the relay server 102 begins relaying the packets. The first message that will be relayed is the HTTP request 13 from the web browser 62 which the relay server 102 already received. The basic concept of the relay server 102 is that it forwards the HTTP request to the web application agent 51 when it receives an HTTP request from the web browser 62. Vice versa, when the web application agent 51 sends a response to the HTTP request, the relay server 102 forwards the HTTP response to the web browser 62. Since it is possible that the browser will create several connections to improve speed or for other reasons, the relay server 102 will work continuously from the web browser's initial HTTP request 13 until receiving the relayed HTTP response 18 when the web browser establishes a connection to the relay server 102 via its newly-opened port.

If the client uses RIA supports, the basic packet relaying process will be similar to the above-described process but may differ in that the system may not need to consider unexpected connections because the connections can be under the system's control. In addition, the system may not need to follow the HTTP protocol, which would result in more convenient ways to effectuate communication for the packet relaying process. Further, the Websocket for HTML 5 or the other connection controls are able to facilitate the packet relays.

In order to reduce the delay of communication between hosts and users, a number of rendezvous servers and relay servers may be distributed in the network. The hole punching process especially may need to be performed in as short a time as possible for a successful NAT traversal. If the hole punching process takes a long time, there is a higher probability that the newly predicted port will be incorrect. For these reasons, the system is capable of supporting a number of rendezvous servers or relay servers for short latency and a better connection between the host and client.

Figure 7:
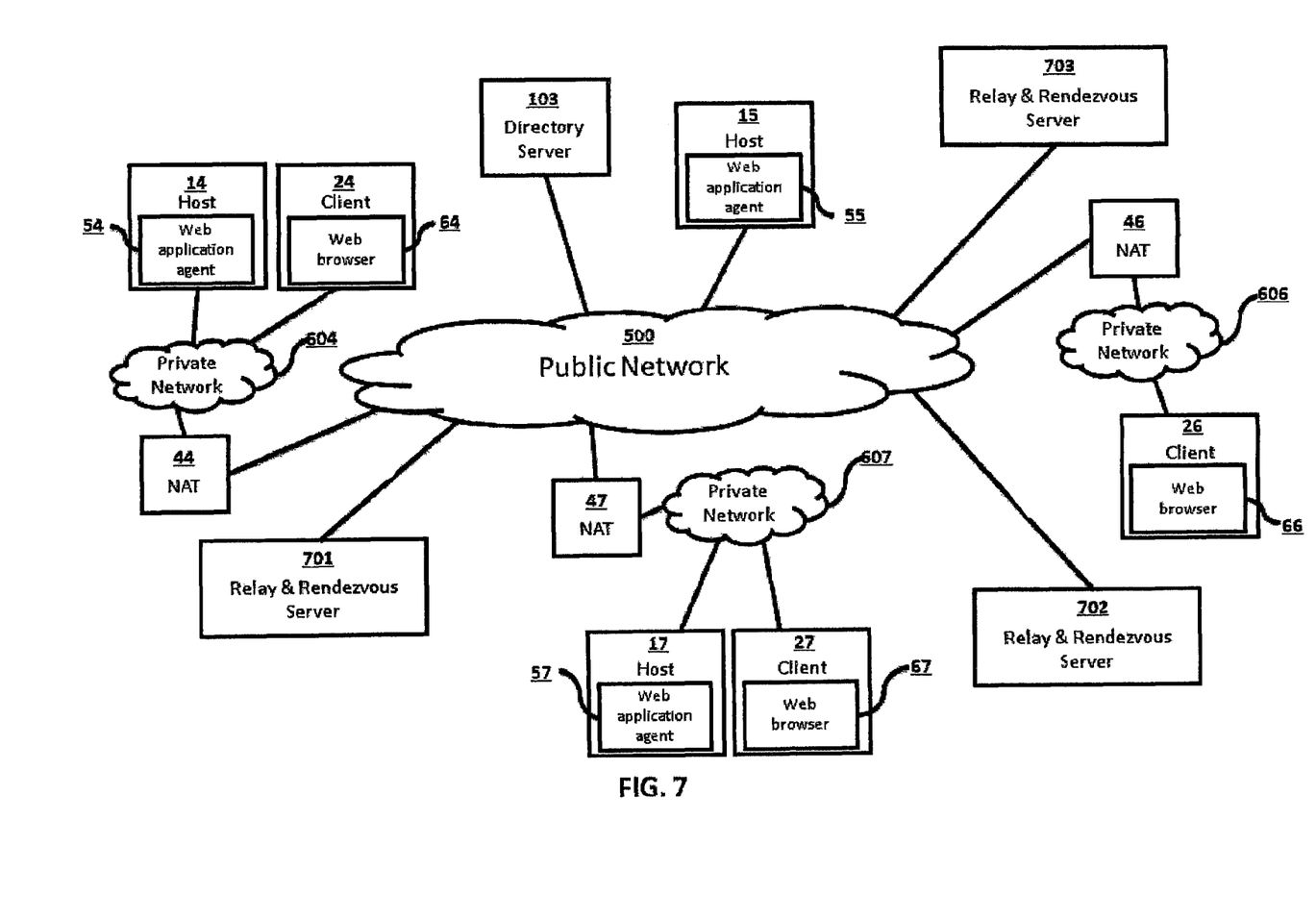
FIG. 7 is an advanced network configuration diagram to support faster solution and higher success ratio of direct connection according to an embodiment of the present invention.

FIG. 7 shows an embodiment of the invention involving distributed rendezvous servers and relay servers. As explained before, servers in this system may be physically or logically separated. Additionally, the servers may coexist on the same piece of physical equipment/hardware or logically within the same software program or construct. In FIG. 7, the rendezvous and relay servers are depicted as one unit. However, the rendezvous and relay servers do not need to be physically together and in the same unit. FIG. 7 shows three relay and rendezvous servers 701, 702, 703 in different locations. Although each rendezvous server and relay server provides the functions as explained before, the host and client will use the server which is best for them. When a client 27 wants to connect to a host 14, the client can be supported by multiple (i.e., 3) rendezvous or relay servers. At the time a client wishes to connect to a host, the system finds the best rendezvous server or relay server measured in terms of server capacity and the speed of the network. The directory server can take the position to find the right or the best rendezvous server when a user selects a host on the available host list or enters a unique host's domain ID within the URL. If one relay & rendezvous server 701 is the closest mid-point for the client and host, and if it provides the fastest hole punching process or packet relay service, that relay & rendezvous server is selected for host 14 and client 27. When a different client 26 needs to connect to a different host 15, another relay & rendezvous server 703 may be selected if it has the shortest path and delay for that client and host. These determinations may be made based on physical location information for hosts and clients. Additionally, a real latency test may be performed and stored for future reference.

Additionally, in further embodiments of the invention, the rendezvous and relay servers may support additional services for users. Since a user (host) might use their computer, the service can be inconsistent due to low network connectivity and power. Moreover, the host might not be able to properly handle the large number of users when the web application agent is running on the personal computer. Therefore, the servers can provide additional services. For example, a mirroring service may be offered in which the server copies a host's web content and hosts the content directly from the server. The server may also offer back-up and archive services to fully or partially back-up the host's data and may also offer data storage services.

In a further embodiment, a possible service that may be offered involves providing multicast services. A multicast service would be used by a host needing to send real-time video data or other type of streaming data to a number of users. The server may facilitate the host in such a situation by relaying the data streams to the users.

In another embodiment, the server may provide electronic transaction services for hosts to accept payments from clients. In yet another embodiment, the server may provide structured data (i.e., in the form of XML, CSV or other file type) for specific information such as stock values, interest rates, weather information or other requested data.

Figure 8:
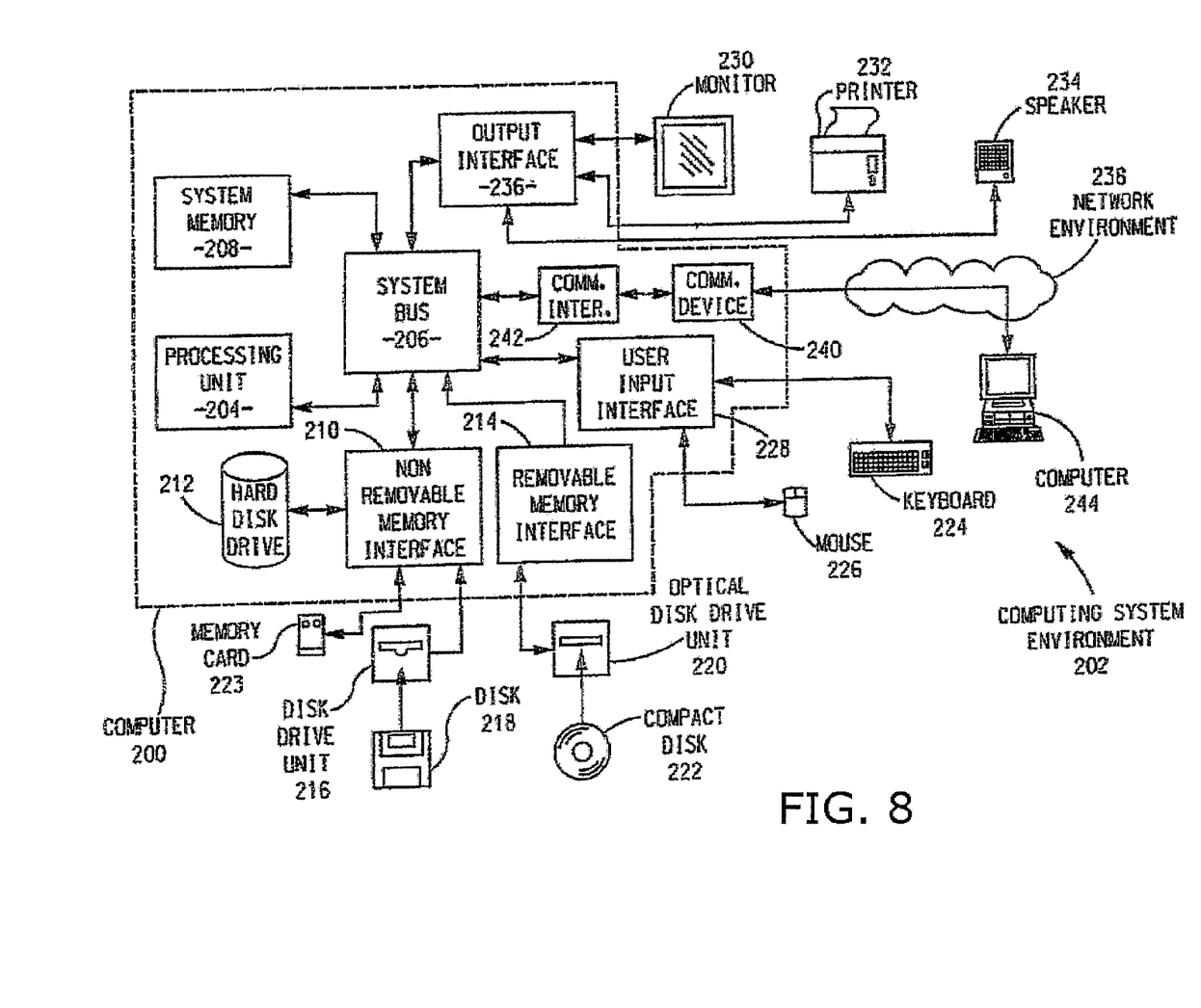
FIG. 8 is a diagram of a computer and network infrastructure.

The present invention may be implemented on a variety of computing devices and systems, wherein these computing devices include the appropriate processing mechanisms and computer-readable media for storing and executing computer-readable instructions, such as programming instructions, code, and the like. As illustrated in FIG. 8 and according to the prior art, a schematic and block diagram of exemplary computing devices, in the form of personal computers 200, 244, in a computing system environment 202 are provided. This computing system environment 202 may include, but is not limited to, at least one computer 200 having certain components for appropriate operation, execution of code, and creation and communication of data. For example, the computer 200 includes a processing unit 204 (typically referred to as a central processing unit or CPU) that serves to execute computer-based instructions received in the appropriate data form and format. Further, this processing unit 204 may be in the form of multiple processors executing code in series, in parallel, or in any other manner for appropriate implementation of the computer-based instructions.

In order to facilitate appropriate data communication and processing information between the various components of the computer 200, a system bus 206 is utilized. The system bus 206 may be any of several types of bus structures, including a memory bus or memory controller, a peripheral bus, or a local bus using any of a variety of bus architectures. In particular, the system bus 206 facilitates data and information communication between the various components (whether internal or external to the computer 200) through a variety of interfaces, as discussed hereinafter.

The computer 200 may include a variety of discrete computer-readable media components. Computer-readable media includes all non-transitory computer-readable media, i.e., any media that can be accessed by the computer 200, except for transitory, propagating signals. Examples of such computer-readable media includes volatile media, non-volatile media, removable media, non-removable media, etc. As a further example, this computer-readable media may include computer storage media, such as media implemented in any method or technology for storage of information such as computer-readable instructions, data structures, program modules, or other data, random access memory (RAM), read only memory (ROM), electrically erasable programmable read only memory (EEPROM), flash memory, or other memory technology, CD-ROM, digital versatile disks (DVDs), or other optical disk storage, magnetic cassettes, magnetic tape, magnetic disk storage, or other magnetic storage devices, or any other medium which can be used to store the desired information and which can be accessed by the computer 200. Further, this computer-readable media may include communications media, such as computer-readable instructions, data structures, program modules, or other data in a modulated data signal such as a carrier wave or other transport mechanism and include any information delivery media, wired media (such as a wired network and a direct-wired connection), and wireless media (such as acoustic signals, radio frequency signals, optical signals, infrared signals, biometric signals, bar code signals, Bluetooth or any acceptable wireless communication format or technology, etc.). Of course, combinations of any of the above should also be included within the scope of computer-readable media.

The computer 200 further includes a system memory 208 with computer storage media in the form of volatile and non-volatile memory, such as ROM and RAM. A basic input/output system (BIOS) with appropriate computer-based routines assists in transferring information between components within the computer 200 and is normally stored in ROM. The RAM portion of the system memory 208 typically contains data and program modules that are immediately accessible to or presently being operated on by processing unit 204, e.g., an operating system, application programming interfaces, application programs, program modules, program data, and other instruction-based computer-readable code.

The computer 200 may also include other removable or non-removable, volatile or non-volatile computer storage media products. For example, the computer 200 may include a non-removable memory interface 210 that communicates with and controls a hard disk drive 212, i.e., a non-removable, non-volatile magnetic medium; and a removable, non-volatile memory interface 214 that communicates with and controls a magnetic disk drive unit 216 (which reads from and writes to a removable, non-volatile magnetic disk 218), an optical disk drive unit 220 (which reads from and writes to a removable, non-volatile optical disk, such as a CD ROM 222), a Universal. Serial Bus (USB) port for use in connection with a removable memory card 223, etc. However, it is envisioned that other removable or non-removable, volatile or non-volatile computer storage media can be used in the exemplary computing system environment 202, including, but not limited to, magnetic tape cassettes, DVDs, digital video tape, solid state RAM, solid state ROM, etc. These various removable or non-removable, volatile or non-volatile magnetic media are in communication with the processing unit 204 and other components of the computer 200 via the system bus 206. The drives and their associated computer storage media discussed above and illustrated in FIG. 1 provide storage of operating systems, computer-readable instructions, application programs, data structures, program modules, program data, and other instruction-based computer-readable code for the computer 200 (whether duplicative or not of the information and data in the system memory 208).

A user may enter commands, information, and data into the computer 200 through certain attachable or operable input devices, such as a keyboard 224, a mouse 226, etc., via a user input interface 228. Of course, a variety of such input devices may be utilized, e.g., a microphone, a trackball, a joystick, a touchpad, a touch-screen, a scanner, etc., including any arrangement that facilitates the input of data and information to the computer 200 from an outside source. As discussed, these and other input devices are often connected to the processing unit 204 through the user input interface 228 coupled to the system bus 206, but may be connected by other interface and bus structures, such as a parallel port, game port, or a USB. Still further, data and information can be presented or provided to a user in an intelligible form or format through certain output devices, such as a monitor 230 (to visually display this information and data in electronic form), a printer 232 (to physically display this information and data in print form), a speaker 234 (to audibly present this information and data in audible form), etc. All of these devices are in communication with the computer 200 through an output interface 236 coupled to the system bus 206. It is envisioned that any such peripheral output devices be used to provide information and data to the user.

The computer 200 may operate in a network environment 238 through the use of a communications device 240, which is integral to the computer or remote therefrom. This communications device 240 is operable by and in communication with the other components of the computer 200 through a communications interface 242. Using such an arrangement, the computer 200 may connect with or otherwise communicate with one or more remote computers, such as a remote computer 244, which may be a personal computer, a server, a router, a network personal computer, a peer device, or other common network node, and typically includes many or all of the components described above in connection with the computer 200. Using appropriate communications devices 240, e.g., a modem, a network interface, or adapter, etc., the computer 200 may operate within and communicate through a local area network (LAN) and a wide area network (WAN), but may also include other networks such as a virtual private network (VPN), an office network, an enterprise network, an intranet, the Internet, etc. It will be appreciated that the network connections shown are exemplary and other means of establishing a communications link between the computers 200, 244 may be used.

As used herein, the computer 200 includes or is operable to execute appropriate custom-designed or conventional software to perform and implement the processing steps of the method and system of the present invention, thereby forming a specialized and particular computing system. Accordingly, the presently-invented method and system may include one or more computers 200 or similar computing devices having a computer-readable storage medium capable of storing computer-readable program code or instructions that cause the processing unit 204 to execute, configure, or otherwise implement the methods, processes, and transformational data manipulations discussed hereinafter in connection with the present invention. Still further, the computer 200 may be in the form of a personal computer, a personal digital assistant, a portable computer, a laptop, a palmtop, a mobile device, a mobile telephone, a server, or any other type of computing device having the necessary processing hardware to appropriately process data to effectively implement the presently-invented computer-implemented method and system.

The invention claimed is:

1. A system for facilitating a direct connection between at least one host and at least one client computer, wherein the at least one host is connected to a public network through at least one Network Address Translation (NAT) gateway between the at least one host and the at least one client computer, the system comprising:
   a rendezvous server computer having a public Internet Protocol (IP) address, wherein the rendezvous server computer is configured to:
   determine if the at least one NAT gateway is traversable by a browser of the at least one client computer;
   receive at least one request from the at least one client computer to retrieve data from the at least one host;
   determine at least one port number, wherein the at least one port number relates to at least one port of the NAT gateway;
   transmit the at least one port number to the at least one client computer; and
   transmit data to the at least one client computer, such that the browser of the at least one client computer is able to initiate at least one direct connection with the at least one host,
   wherein the rendezvous server computer determines whether the at least one NAT gateway is traversable by determining whether ports opened by the NAT gateway are predictable, and when the ports opened by the NAT gateway are determined to be predictable, determining whether the NAT gateway allows incoming SYN packets on a port used by a preceding outgoing SYN packet, and when the NAT gateway is determined to allow incoming SYN packets, determining whether the NAT gateway closes at least one open port after receiving a Time Exceeded ICMP message, and when the NAT gateway is determined to close at least one open port after receiving a Time Exceeded ICMP message, determining an amount of hops between the NAT gateway and the at least one client computer.

2. The system of claim 1, wherein the at least one client computer is connected to a public network through at least one client-side NAT gateway, and wherein the rendezvous server computer facilitates traversal of the at least one client-side NAT gateway.

3. The system of claim 1, wherein the at least one direct connection is an HTTP connection.

4. The system of claim 1, further comprising a directory server connected to a network, wherein data relating to the at least one host is stored on at least one data storage device associated with the directory server, and wherein the data relating to the at least one host is made available to the at least one client computer.

5. The system of claim 1, further comprising a relay server configured to facilitate indirect data exchange between the at least one host and the at least one client.

6. The system of claim 1, wherein the at least one host is comprised of at least one computer having a web application agent configured to communicate with the rendezvous server and the at least one client computer.

7. The system of claim 6, wherein the web application agent includes at least one of the following: application for HTML editing, application for web content creation, web content templates, or any combination thereof.

8. A computer-implemented method for establishing a direct connection between at least one host computer and at least one client computer, wherein the at least one host computer is connected to a network through at least one Network Address Translation (NAT) gateway between the at least one host and the at least one client computer, the method comprising:

receiving, by a rendezvous server, data relating to the at least one host computer;

determining, by the rendezvous server, whether the at least one NAT gateway is traversable by a browser of the at least one client computer;

receiving, by the rendezvous server, a request from at least one client computer to access the at least one host computer;

determining, by the rendezvous server, at least one port number, wherein the at least one port number corresponds to at least one port of the at least one NAT gateway; and transmitting, by the rendezvous server, data relating to the at least one host computer to the at least one client computer, wherein the data relating to the at least one host computer includes the at least one port number, such that the browser of the at least one client computer is able to initiate at least one direct connection with the at least one host computer, wherein the determining, by the rendezvous server, whether the at least one NAT gateway is traversable by a browser of the at least one client computer comprises determining whether ports opened by the NAT gateway are predictable, and when the ports opened by the NAT gateway are determined to be predictable, determining whether the NAT gateway allows incoming SYN packets on a port used by a preceding outgoing SYN packet, and when the NAT gateway is determined to allow incoming SYN packets, determining whether the NAT gateway closes at least one open port after receiving a Time Exceeded ICMP message, and when the NAT gateway is determined to close at least one open port after receiving a Time Exceeded ICMP message, determining an amount of hops between the NAT gateway and the at least one client computer.

9. The computer-implemented method of claim 8, further comprising:

providing, by a relay server, a packet relay service to enable communication between the at least one host computer and the at least one client computer.

10. The computer-implemented method of claim 8, wherein the at least one direct connection is an HTTP connection, and wherein the at least one direct connection is established through at least one of the following: HTML iframe tag, Rich Internet Application (RIA), AJAX function, Websocket, or any combination thereof.

11. The computer-implemented method of claim 8, further comprising:

providing, by the rendezvous server, at least one service to the at least one host computer, wherein the at least one service includes at least one of the following: mirroring service, back-up service, multicast service, electronic payment service, structured information service, remote storage service, or any combination thereof.

12. The computer-implemented method of claim 8, further comprising:

providing, by the rendezvous server, users associated with the at least one host computer with at least one of the following: application for HTML editing, application for web content creation, web content templates, or any combination thereof.

13. The computer-implemented method of claim 8, further comprising:

providing, by a directory server, a directory to the at least one client computer, wherein the directory contains information relating to the at least one host computer.

14. The computer-implemented method of claim 13, wherein the directory is a website having search capabilities.

15. The computer-implemented method of claim 8, further comprising:

providing, by the rendezvous server, a direct URL service to enable the at least one client computer to access the at least one host computer by using a URL unique to the at least one host computer.

16. The computer-implemented method of claim 8, wherein the at least one client computer is connected to a public network through at least one client-side NAT gateway, the method further comprising:

receiving, by the rendezvous server, data relating to the at least one client computer;

determining, by the rendezvous server, whether the at least one client-side NAT gateway is traversable;

determining, by the rendezvous server, at least one client-side port number, wherein the at least one client-side port number corresponds to at least one port of the at least one client-side NAT gateway; and transmitting, by the rendezvous server, data relating to the at least one client computer to the at least one host computer, wherein the data relating to the at least one client computer includes the at least one client-side port number.

17. A non-transitory computer readable storage medium having stored therein instructions for causing one or more processors to execute the steps of the computer-implemented method as claimed in claim 8.

18. A computer program product comprising a non-transitory computer readable medium having control logic stored therein for causing a host computer to provide web content to at least one client computer, wherein the host computer is connected to a public network through at least one Network Address Translation (NAT) gateway between the at least one host and the at least one client computer, the control logic comprising:

first computer readable program code for causing the host computer to transmit data relating to the host computer to a rendezvous server;

second computer readable program code for causing the host computer to receive a connection request from the rendezvous server;

third computer readable program code for causing the host computer to receive, from the rendezvous server, data configured to determine whether the at least one NAT gateway is traversable by a browser of the at least one client computer;

fourth computer readable program code for causing the host computer to receive at least one HTTP request directly from the browser of the at least one client computer, wherein the at least one HTTP request traverses the at least one NAT gateway; and fifth computer readable program code for causing the host computer to transmit at least one HTTP response directly to the browser of the at least one client computer, wherein the data configured to determine whether the at least one NAT gateway is traversable by a browser of the at least one client computer comprises data for determining whether ports opened by the NAT gateway are predictable, and when the ports opened by the NAT gateway are determined to be predictable, determining whether the NAT gateway allows incoming SYN packets on a port used by a preceding outgoing SYN packet, and when the NAT gateway is determined to allow incoming SYN packets, determining whether the NAT gateway closes at least one open port after receiving a Time Exceeded ICMP message, and when the NAT gateway is determined to close at least one open port after receiving a Time Exceeded ICMP message, determining an amount of hops between the NAT gateway and the at least one client computer.

19. The system of claim 1, wherein the rendezvous server computer is configured to determine the at least one port number by establishing a connection with the at least one host, determining based on a port number of the at least one host for the established connection a next port number of the at least one NAT gateway expected to be open, establishing a connection with the browser of the at least one client computer based on a message received from the browser, determining based on a port number of the at least one client computer for the established connection a next port number of the at least one client computer, sending the next port number of the at least one client computer to the at least one host, receiving a reporting message from the at least one host indicating that a SYN packet has been sent and that the at least one host has opened the at least one port number.

20. The system of claim 1, wherein the rendezvous server computer is configured to further transmit at least one IP address with the at least one port number to the at least one client computer.

\* \* \* \* \*